June 9, 1953 L. G. GUNION ET AL 2,641,502
AUXILIARY WINDSHIELD FOR CONVERTIBLE AUTOMOBILES
Filed Dec. 13, 1950 2 Sheets-Sheet 1
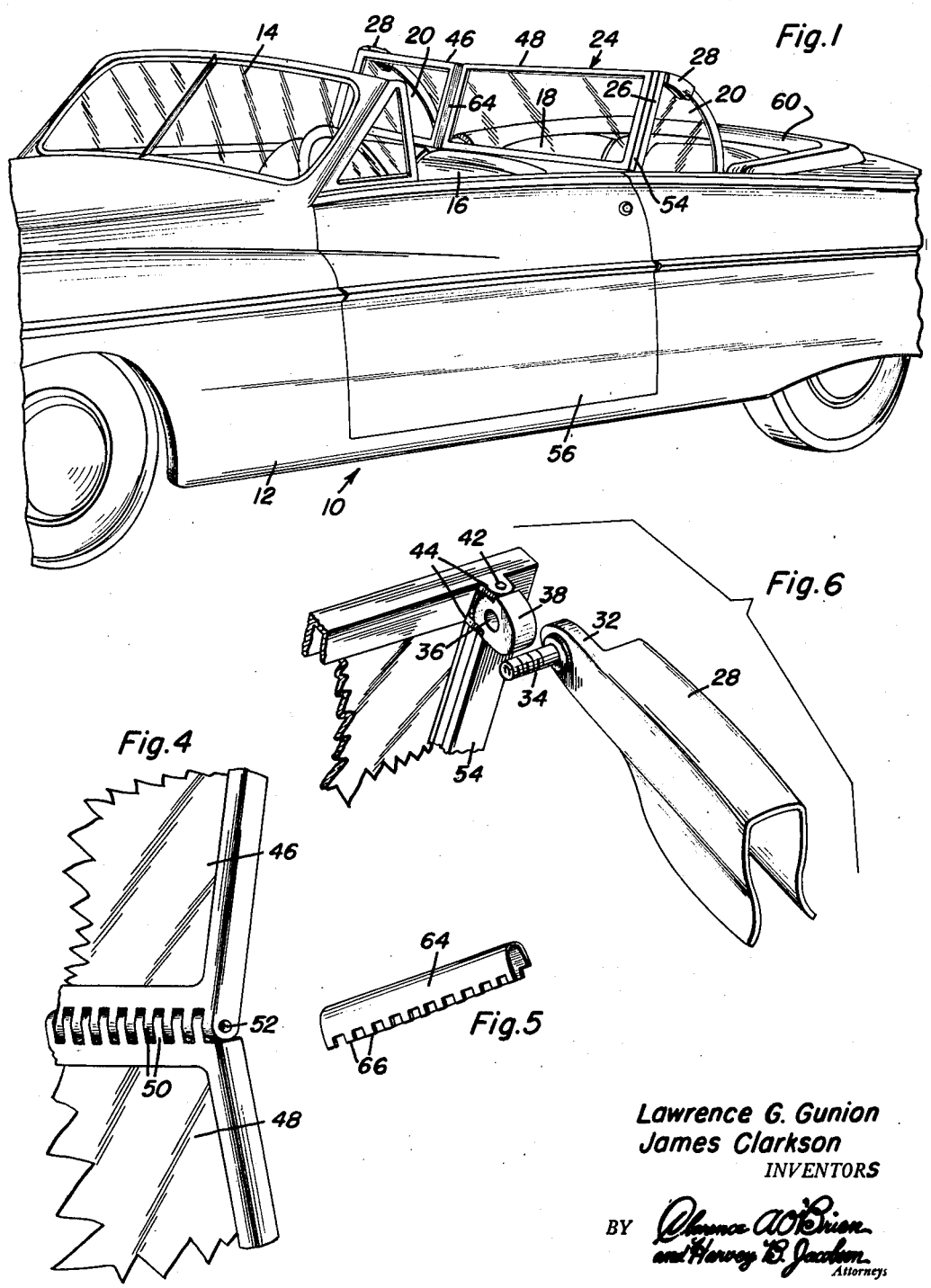
Lawrence G. Gunion
James Clarkson
INVENTORS

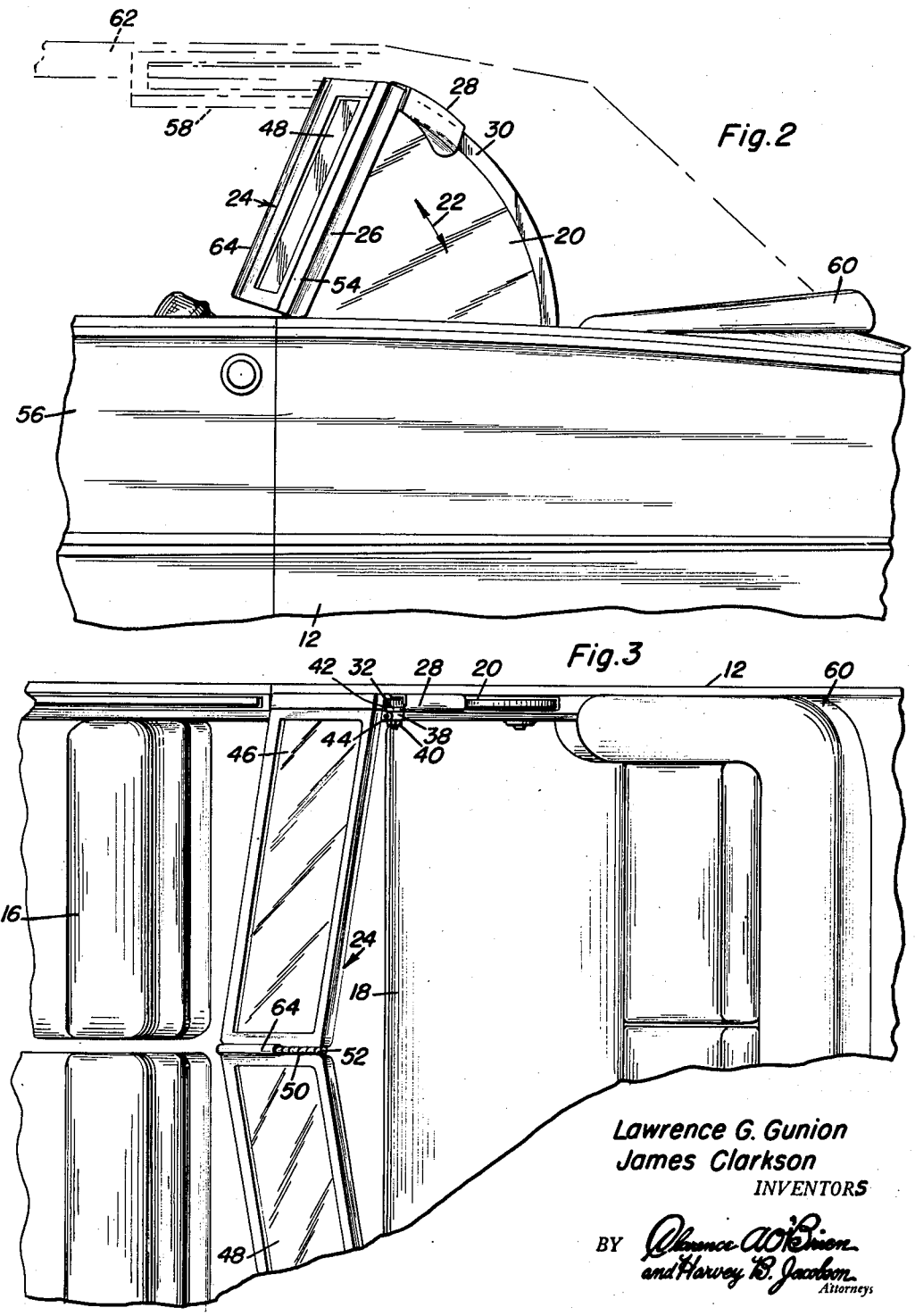

Patented June 9, 1953

2,641,502

UNITED STATES PATENT OFFICE 2,641,502

AUXILIARY WINDSHIELD FOR CONVERTIBLE AUTOMOBILES

Lawrence G. Gunion, Lake Orion, and James Clarkson, Ferndale, Mich.

Application December 13, 1950, Serial No. 200,642

3 Claims. (Cl. 296—85)

This invention relates to new and useful improvements and structural refinements in bodies of convertible automobiles, and the principal object of the invention is to protect rear seat passengers of such vehicles against head wind.

The above object is achieved by the provision of an auxiliary windshield which is adapted to be mounted rearwardly of the usual front windshield but forwardly of the rear seat, an important feature of the invention residing in the provision of means for attaching the auxiliary windshield to the usual rear side windows.

Some of the advantages of the invention reside in its simplicity of construction, in its convenient adjustability, in its pleasing appearance, and in its adaptability for use in convertible automobiles of different types.

With the above more important objects and features in view and such other objects and features as may become apparent as this specification proceeds, the invention consists essentially in the arrangement and construction of parts as illustrated in the accompanying drawings, in which:

Figure 1 is a fragmentary perspective view of a convertible automobile, showing the invention installed thereon;

Figure 2 is a fragmentary side elevational view of the subject shown in Figure 1;

Figure 3 is a fragmentary top plan view of the same;

Figure 4 is a fragmentary top plan view, on an enlarged scale, of the auxiliary windshield assembly, showing the hinge means for connecting together the two sections thereof;

Figure 5 is a perspective view of a cover piece for the hinge means shown in Figure 4; and Figure 6 is a fragmentary group perspective view illustrating an attaching clamp member and hinges at one end of the auxiliary windshield.

Like characters of reference are employed to designate like parts in the specification and throughout the several views.

Referring now to the accompanying drawings in detail, the general reference character 10 designates a convertible automobile having a body 12 provided with the usual, front windshield assembly 14 and including a front seat 16 and a rear seat 18.

The usual, transversely spaced rear side windows 20 are provided on the body 12 and are swingable in substantially vertical planes, as indicated by the arrow 22 in Figure 2, whereby they may be lowered or raised, as desired.

The instant invention resides in the provision of an auxiliary windshield assembly which is designated generally by the reference character 24 and is mounted transversely between forward edges 26 of the rear side windows 20, the auxiliary windshield assembly 24 being spaced rearwardly from the front windshield 14, but being disposed forwardly of the rear seat 18, so that the rear seat passengers are protected thereby.

The auxiliary windshield assembly 24 is supported solely by the rear side windows 20, to which end a pair of elongated, channel-shaped clamp members 28 of resilient material are applied to upper edges 30 of the two rear side windows 20, the members 28 having forwardly projecting extensions 32 (see Figure 6) equipped with inwardly projecting, screw-threaded, horizontal hinge pins 34.

The hinge pins 34 extend through apertures 36 in a pair of hinge blocks, one of which is shown at 38 in Figure 6, and a nut 40 is provided on each screw-threaded hinge pin 34 for obvious reasons.

The two hinge blocks 38 are hingedly attached by pivot pins 42 to suitable brackets 44 provided at the opposite ends of the auxiliary windshield assembly 24, it being noted that the pins 42 are disposed substantially at right angles to the hinge pins 34, as shown.

The auxiliary windshield assembly 24 itself consists of a pair of complemental half sections 46, 48 which have inner side edges thereof provided with interfitting hinge lugs 50 for connection by a hinge pin 52, whereby the angular relationship of the two sections may be adjusted.

Moreover, by virtue of this adjustment, the over-all "width" of the auxiliary windshield unit may be increased or decreased so as to accommodate automobiles of different types, this being further facilitated by the pivotal mounting 42 of the hinge blocks 38, which permits the hinge blocks 38 to rotate freely on the hinge pins 34 regardless of the angular relationship of the windshield sections 46, 48.

The hinge blocks 38 are disposed at the upper edges of the auxiliary windshield assembly, and when the invention is placed in use, the outer side edges 54 of the windshield assembly rest on the forward edges 26 of the rear side windows 20, whereby the latter constitute sole means for supporting the auxiliary windshield. Moreover, by raising or lowering the side windows 20, the windshield assembly 24 may assume a greater or lesser inclination, thus enabling the rear seat passengers to adjust the windshield to suit their own requirements.

When the rear seat passengers wish to leave the vehicle through either of the doors 56 at the side of the front seat 16, the auxiliary windshield 24 may be swung upwardly about the hinge pins 34 to the position illustrated at 58 in Figure 2, so as to permit the rear seat passengers to pass under the same.

Moreover, in the event the convertible top 60 of the vehicle is raised to the position shown at 62 in Figure 2, in which event the use of the auxiliary windshield may not be necessary, the same may be swung upwardly to the position shown at 58 immediately under the raised top, so that it is comparatively inobtrusive.

For sake of appearance, a channel-shaped cover piece 64 may be applied to the hinge means between the windshield sections 46, 48, the cover piece 64 being provided at its longitudinal edges with a set of spaced lugs 66 adapted to be received in the spaces between the lugs 50 of the hinge unit, whereby to removably sustain the cover piece in position.

It is believed that the advantages and use of the invention will be clearly understood from the foregoing disclosure, and accordingly, further description thereof at this point is deemed unnecessary.

Having described the invention, what is claimed as new is:

1. In combination with a convertible automobile body including a front windshield assembly and a pair of transversely spaced rear side windows, an auxiliary windshield assembly spaced rearwardly from the front windshield assembly and extending transversely between and abutting front edges of said rear windows, and mounting means including a pair of clamp members positioned on upper edges of the respective rear windows, inwardly projecting hinge pins provided on said clamp members, and hinge blocks provided at the upper edge on opposite ends of said auxiliary windshield assembly and rotatably mounted on said hinge pins whereby the auxiliary windshield assembly is attached to said rear windows and may be swung forwardly and upwardly relative thereto, said clamp members constituting sole support means for said auxiliary windshield assembly.

2. The combination as defined in claim 1 wherein said auxiliary windshield assembly comprises a pair of complemental half sections and upwardly extending hinge means connecting inner side edges of said half sections together, brackets provided at the outer side edges of said half sections, and pivot pins connecting said hinge blocks to said brackets, said pivot pins being disposed substantially at right angles to said hinge pins.

3. The device as defined in claim 2 together with a removable cover piece provided on said hinge means between said half sections.

LAWRENCE G. GUNION.
JAMES CLARKSON.

References Cited in the file of this patent

UNITED STATES PATENTS

| Number | Name | Date |
|---|---|---|
| 1,606,675 | Tasman | Nov. 9, 1926 |
| 2,040,624 | Morrison | May 12, 1936 |

FOREIGN PATENTS

| Number | Country | Date |
|---|---|---|
| 18,897 | Great Britain | Aug. 20, 1913 |